United States Patent
Goto

(10) Patent No.: US 11,345,354 B2
(45) Date of Patent: May 31, 2022

(54) VEHICLE CONTROL DEVICE, VEHICLE CONTROL METHOD AND COMPUTER-READABLE MEDIUM CONTAINING PROGRAM

(71) Applicant: SUBARU CORPORATION, Tokyo (JP)

(72) Inventor: Ikuo Goto, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 241 days.

(21) Appl. No.: 16/786,751

(22) Filed: Feb. 10, 2020

(65) Prior Publication Data
US 2020/0307611 A1    Oct. 1, 2020

(30) Foreign Application Priority Data

Mar. 25, 2019    (JP) .............................. JP2019-056887

(51) Int. Cl.
*B60W 40/09* (2012.01)
*B60W 60/00* (2020.01)
(Continued)

(52) U.S. Cl.
CPC ............ *B60W 40/09* (2013.01); *B60W 40/02* (2013.01); *B60W 60/0016* (2020.02);
(Continued)

(58) Field of Classification Search
CPC .. B60W 40/09; B60W 60/0016; B60W 40/02; B60W 2556/65; B60W 2540/22; G06K 9/00845
See application file for complete search history.

(56) References Cited

U.S. PATENT DOCUMENTS 10,151,594 B1 * 12/2018 Chan ..................... G06V 20/597
10,293,830 B2 * 5/2019 Selvaraj ................. G08B 21/06
(Continued)

FOREIGN PATENT DOCUMENTS

JP    2015-089801 A    5/2015
JP    2016-052881 A    4/2016
(Continued)

OTHER PUBLICATIONS

T. Iwase et al., "Analysis of Driving Behavior in Different Situations and Individuals", Transactions of the Society of Automotive Engineers of Japan, Inc. vol. 40, No. 3, May 2009.
(Continued)

*Primary Examiner* — Fadey S. Jabr
*Assistant Examiner* — Naeem Taslim Alam
(74) *Attorney, Agent, or Firm* — McDermott Will & Emery LLP

(57) ABSTRACT

A vehicle control apparatus includes an interaction determination unit, an occupant emotion acquisition unit, and a vehicle controller. The interaction determination unit is configured to determine a second vehicle that interacts with a first vehicle during automated driving. The occupant emotion acquisition unit is configured to acquire an emotion of an occupant of the first vehicle. The vehicle controller is configured to perform vehicle control of the first vehicle, on the basis of the emotion of the occupant of the first vehicle and an emotion of an occupant of the second vehicle that has been determined to interact with the first vehicle by the interaction determination unit.

15 Claims, 7 Drawing Sheets

(51) Int. Cl.
  *B60W 40/02* (2006.01)
  *G06V 20/59* (2022.01)
(52) U.S. Cl.
  CPC ....... *G06V 20/597* (2022.01); *B60W 2540/22* (2013.01); *B60W 2556/65* (2020.02)

(56) References Cited

U.S. PATENT DOCUMENTS

| | | | |
|---|---|---|---|
| 2015/0243172 A1* | 8/2015 | Eskilson | G08G 1/22 |
| | | | 701/1 |
| 2017/0225677 A1 | 8/2017 | Yoshida et al. | |
| 2018/0065632 A1* | 3/2018 | Gordon | B60W 30/16 |
| 2018/0174457 A1* | 6/2018 | Taylor | G08G 1/096741 |
| 2018/0244175 A1* | 8/2018 | Tan | B62D 1/183 |
| 2018/0259956 A1 | 9/2018 | Kawamoto | |
| 2018/0357894 A1* | 12/2018 | Bjersing | G08G 1/0141 |
| 2018/0373980 A1* | 12/2018 | Huval | G06K 9/6254 |
| 2019/0088135 A1* | 3/2019 | Do | G08G 1/163 |
| 2019/0163176 A1* | 5/2019 | Wang | G05D 1/0038 |
| 2019/0196486 A1* | 6/2019 | Ishikawa | G05D 1/0287 |
| 2019/0232974 A1* | 8/2019 | Reiley | G06V 20/597 |
| 2019/0392235 A1* | 12/2019 | Shimizu | H04W 4/40 |
| 2020/0079368 A1* | 3/2020 | Yamada | G05D 1/0055 |
| 2020/0175787 A1* | 6/2020 | Gortsas | G07C 5/10 |
| 2020/0184243 A1* | 6/2020 | Kanda | H04N 5/2253 |
| 2020/0193198 A1* | 6/2020 | Wang | B60W 40/09 |
| 2020/0202108 A1* | 6/2020 | Matsuo | G06V 40/16 |
| 2021/0237645 A1* | 8/2021 | Farrell | B60H 1/00978 |

FOREIGN PATENT DOCUMENTS

| | | |
|---|---|---|
| JP | 2017-136922 A | 8/2017 |
| WO | 2017/057060 A1 | 4/2017 |

OTHER PUBLICATIONS

S. Horiuchi, "How to Use Driver Models", Symposium Text of the Society of Automotive Engineers of Japan, Inc., No. 06-05, pp. 71-78, with English translation.

* cited by examiner

VEHICLE CONTROL DEVICE, VEHICLE CONTROL METHOD AND COMPUTER-READABLE MEDIUM CONTAINING PROGRAM

CROSS-REFERENCE TO RELATED APPLICATIONS

The present application claims priority from Japanese Patent Application No. 2019-056887 filed on Mar. 25, 2019, the entire contents of which are hereby incorporated by reference.

BACKGROUND

The technology relates to a vehicle control apparatus, a vehicle control method, and a computer-readable medium containing a program.

For example, Japanese Unexamined Patent Application Publication (JP-A) No. 2015-89801 and WO 2017/057060 disclose techniques for an automated driving vehicle. The techniques suppress anxiety or discomfort of an occupant (a driver or a passenger) by reflecting driving characteristics of the occupant in traveling control. Various models related to traveling of a vehicle are disclosed in Transactions of the Society of Automotive Engineers of Japan, Inc. Vol. 40, No. 3, May 2009. "Analysis of Driving Behavior in Different Situations and Individuals" (hereinafter referred to as NPTL 1), and Symposium Text of the Society of Automotive Engineers of Japan, Inc., No. 06-05, pp. 71-78 (hereinafter referred to as NPTL 2).

JP-A Nos. 2016-52881 and 2017-136922 disclose techniques of measuring an occupant's anxiety, determining a cause of the anxiety, and adjusting traveling control depending on a result of the determination to reduce the anxiety.

SUMMARY

An aspect of the technology provides a vehicle control apparatus including an interaction determination unit, an occupant emotion acquisition unit, and a vehicle controller. The interaction determination unit is configured to determine a second vehicle that interacts with a first vehicle during automated driving. The occupant emotion acquisition unit is configured to acquire an emotion of an occupant of the first vehicle. The vehicle controller is configured to perform vehicle control of the first vehicle, on the basis of the emotion of the occupant of the first vehicle and an emotion of an occupant of the second vehicle that has been determined to interact with the first vehicle by the interaction determination unit.

An aspect of the technology provides a vehicle control method including: determining a second vehicle that interacts with a first vehicle during automated driving; and performing vehicle control of each of the first vehicle and the second vehicle, on the basis of an emotion of an occupant of each of the first vehicle and the second vehicle that interact with each other.

An aspect of the technology provides a non-transitory computer-readable medium containing a program. The program causes, when executed by a computer, the computer to implement a method. The method includes: determining a second vehicle that interacts with a first vehicle during automated driving; and performing vehicle control of the first vehicle, on the basis of an emotion of an occupant of each of the first vehicle and the second vehicle that interact with each other.

An aspect of the technology provides a vehicle control apparatus including circuitry configured to determine a second vehicle that interacts with a first vehicle during automated driving, acquire an emotion of an occupant of the first vehicle, and perform vehicle control of the first vehicle, on the basis of the emotion of the occupant of the first vehicle and an emotion of an occupant of the second vehicle that has been determined to interact.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
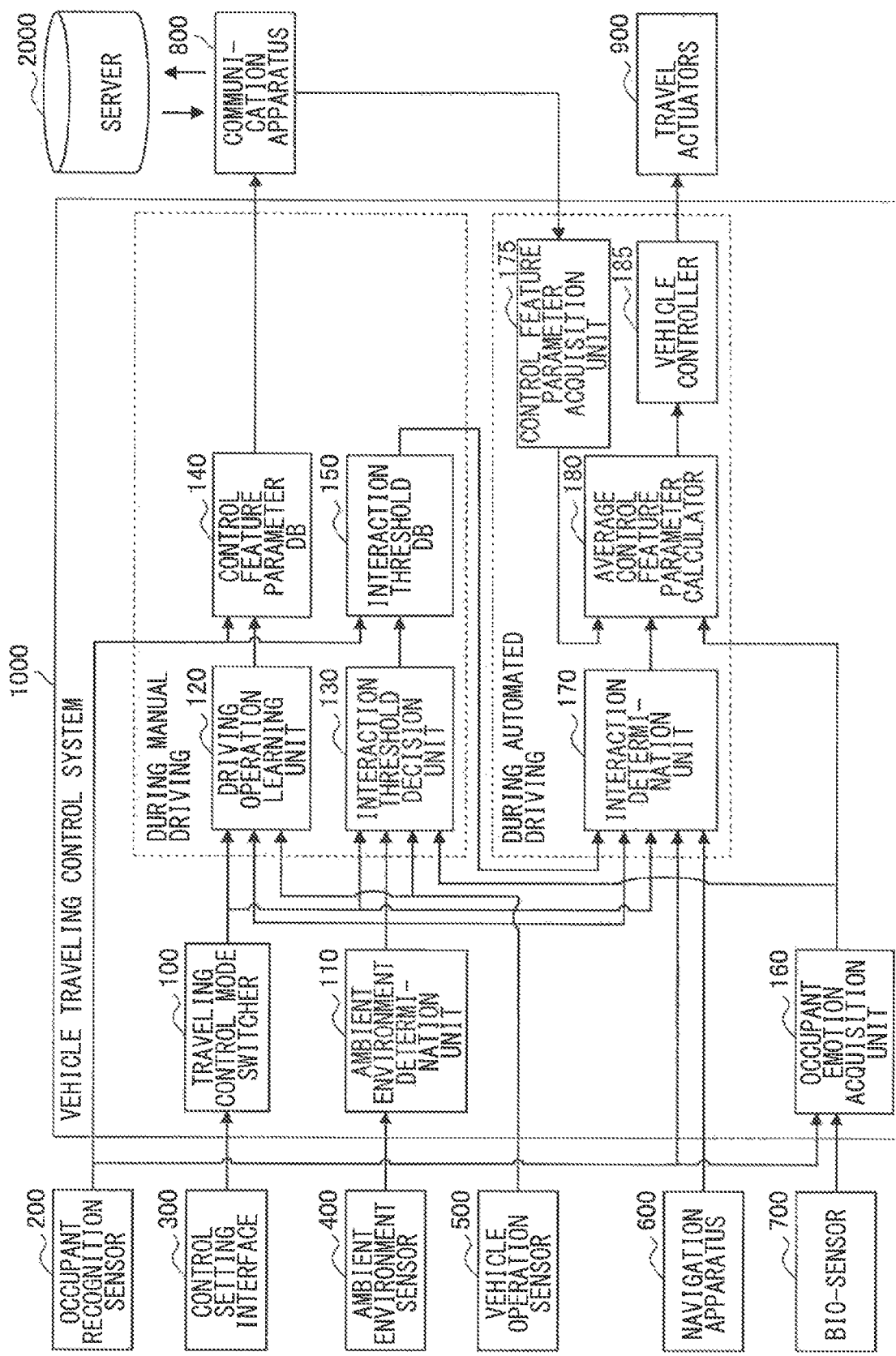
FIG. 1 is a schematic diagram illustrating a vehicle traveling control system according to one example embodiment of the technology and its peripheral configuration.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

In a case where a plurality of vehicles is traveling, it is desired for cooperative driving of these vehicles that driving be performed without causing stress in occupants' emotions. However, even if the vehicles are in the same situation, different occupants have different driving characteristics or different emotion levels. For example, an inter-vehicle distance to a preceding vehicle is taken as an example. Some people prefer an inter-vehicle distance of about 20 meters and feel fear at an inter-vehicle distance equal to or less than 20 meters, whereas some people prefer an inter-vehicle distance of about 30 meters and feel fear at an inter-vehicle distance equal to or less than 30 meters. A distance at which an occupant feels fear also changes depending on situation, such as a vehicle speed, a road width, or an amount of traffic.

On the other hand, if traveling control reflecting driving characteristics is applied for each vehicle, the vehicles operate differently from each other under a certain situation. This on the contrary can promote anxiety or discomfort. For example, assume a situation in which two automated driving vehicles are waiting in line at traffic lights. In this case, if a driver of the preceding vehicle is patient and a driver of the subsequent vehicle is impatient, and traveling control reflecting the characteristics is applied to the respective vehicles, the preceding vehicle and the subsequent vehicle accelerate differently from a halt state. This can cause the driver of the subsequent vehicle to feel irritated.

The methods of making adjustment depending on the measured emotion, as described in JP-A Nos. 2016-52881 and 2017-136922, are disadvantageous in that control is carried out ex post facto after the occupant feels anxiety or discomfort.

It is desirable to provide a vehicle control apparatus, a vehicle control method, and a computer-readable medium containing a program that make it possible to perform more suitable automated driving, depending on driving characteristics of respective occupants of a plurality of vehicles.

In one example embodiment of the technology, vehicles that are under traveling control reflecting driving characteristics may achieve cooperative traveling in the following manner. In a case where the vehicles are present at positions that allow interaction, weighting may be performed on parameters (control feature parameters) characterizing the traveling control, to generate an average control feature parameter. The traveling control reflecting the parameter may be applied to each of the vehicles. It is to be noted that "interaction" indicates a case where the vehicles are influenced by each other, and one vehicle is put under traveling control that is deviated from driving characteristics intended by a driver. "Driving characteristics" indicate the driving characteristics intended by the driver, and indicate characteristics of driving that are achieved by operation such as accelerator operation, brake operation, or steering performed by the driver. For example, interaction may occur in cases such as a case where a subsequent vehicle travels to follow a preceding vehicle, or a case where vehicles are present at a distance close enough to possibly cause collision in changing lanes. Being subjected to the interaction, one vehicle deviates from the driving characteristics intended by the driver. For example, at the time of making start from the halt state, an acceleration of the preceding vehicle relatively increases, and an acceleration of the subsequent vehicle relatively decreases.

In generating the average control feature parameter, weighting may be performed that reflects an emotion state of the occupant in each of the vehicles. In one example, the emotion state may be sensed from information such as bio-information, and weighting may be performed between the vehicles to improve the emotion state. For example, at the time of making start from the halt state, weighting may be performed with importance placed on the occupant of the subsequent vehicle in a case where the occupant of the subsequent vehicle has a bad emotion state and the occupant of the preceding vehicle has a good emotion state. If it is possible to convert emotion states into numbers, weighting may be performed on the basis of the numbers.

In generating the average control feature parameter, weighting may be performed on the basis of a safe driving level of each vehicle occupant. In other words, priority may be given to the driving characteristics of a driver who is driving safely.

This technology is not only applicable to a vehicle that performs automated driving reflecting driving characteristics. For example, even in a case of automated driving not reflecting driving characteristics, parameters determining its traveling control may be set by a manufacturer. Because the parameters may differ depending on the manufacturer, this technology is applicable.

FIG. 1 is a schematic diagram illustrating a vehicle traveling control system 1000 according to one example embodiment of the technology and its peripheral configuration. The vehicle traveling control system 1000 may include a traveling control mode switcher 100, an ambient environment determination unit 110, a driving operation learning unit 120, an interaction threshold decision unit 130, a control feature parameter database (DB) 140, an interaction threshold database (DB) 150, an occupant emotion acquisition unit 160, an interaction determination unit 170, a control feature parameter acquisition unit 175, an average control feature parameter calculator 180, and a vehicle controller 185. It is to be noted that each element of the vehicle traveling control system 1000 may include a circuit (hardware), or may include a processing unit such as a central processing unit (CPU) and a program (software) that causes the CPU to operate. In one embodiment, the vehicle traveling control system 1000 may serve as a "vehicle control apparatus". In one embodiment, the interaction determination unit 170 may serve as an "interaction determination unit". In one embodiment, the occupant emotion acquisition unit 160 may serve as an "occupant emotion acquisition unit". In one embodiment, the vehicle controller 185 may serve as a "vehicle controller". In one embodiment, the control feature parameter acquisition unit 175 may serve as a "control feature parameter acquisition unit". In one embodiment, the average control feature parameter calculator 180 may serve as a "common control feature parameter calculator". In one embodiment, the ambient environment determination unit 110 may serve as an "ambient environment determination unit".

To the vehicle traveling control system 1000 may be coupled an occupant recognition sensor 200, a control setting interface 300, an ambient environment sensor 400, a vehicle operation sensor 500, a navigation apparatus 600, a bio-sensor 700, a communication apparatus 800, and travel actuators 900. The vehicle traveling control system 1000 is able to communicate with an external server 2000 via the communication apparatus 800.

The occupant recognition sensor 200 may include, for example, a camera that captures an image of an occupant, and may recognize the occupant from a facial image of the occupant. The control setting interface 300 may be an interface that performs setting of a driving control mode. The occupant recognition sensor 200 may also include, for example, a microphone that acquires the occupant's speech.

The ambient environment sensor 400 may include a stereo camera, a monocular camera, a millimeter-wave radar, or an infrared sensor, for example, and may measure position and speed of a person or a vehicle, for example, around the own vehicle. In a case where the ambient environment sensor 400 includes a stereo camera, the stereo camera may include, a pair of left and right cameras including an image sensor such as a charge coupled device (CCD) sensor or a complementary metal oxide semiconductor (CMOS) sensor. The stereo camera may capture an image of an external environment outside the vehicle, and send the captured image information to the vehicle traveling control system 1000. As an example, the stereo camera may include a color camera that is able to acquire color information, and may be installed at the top of a windshield of the vehicle.

The vehicle operation sensor 500 may be a sensor that detects an amount of vehicle operation, such as an accelerator position, an amount of brake depression, or a steering angle, and detects a parameter indicating a driving state as a result of the vehicle operation, such as a speed, an acceleration, or a yaw rate of the vehicle. The vehicle operation sensor 500 may be configured to acquire information communicated via a controller area network (CAN) in the vehicle.

The navigation apparatus 600 may search for a route from a current location to a destination, on the basis of map information. Accordingly, the navigation apparatus 600 is able to acquire a current position of the vehicle by a global positioning system (GPS), for example. The navigation apparatus 600 may store a route along which the vehicle has traveled to the current location.

The bio-sensor 700 may be a sensor that detects brain waves, cerebral blood flow, blood pressure, perspiration, an electrocardiogram, a heart rate, eye movement, or a pupil diameter, for example. The occupant's emotion may be estimated from these pieces of information detected by the bio-sensor 700, facial information of the occupant recognized by the occupant recognition sensor 200, or other information.

The communication apparatus 800 may communicate with the outside of the vehicle, and transmit and receive various kinds of information. For example, the communication apparatus 800 may perform communication with the external server 2000 or inter-vehicle communication with another vehicle. The vehicle traveling control system 1000 may share information with another vehicle by communication via the server 2000 or inter-vehicle communication.

Figure 2:
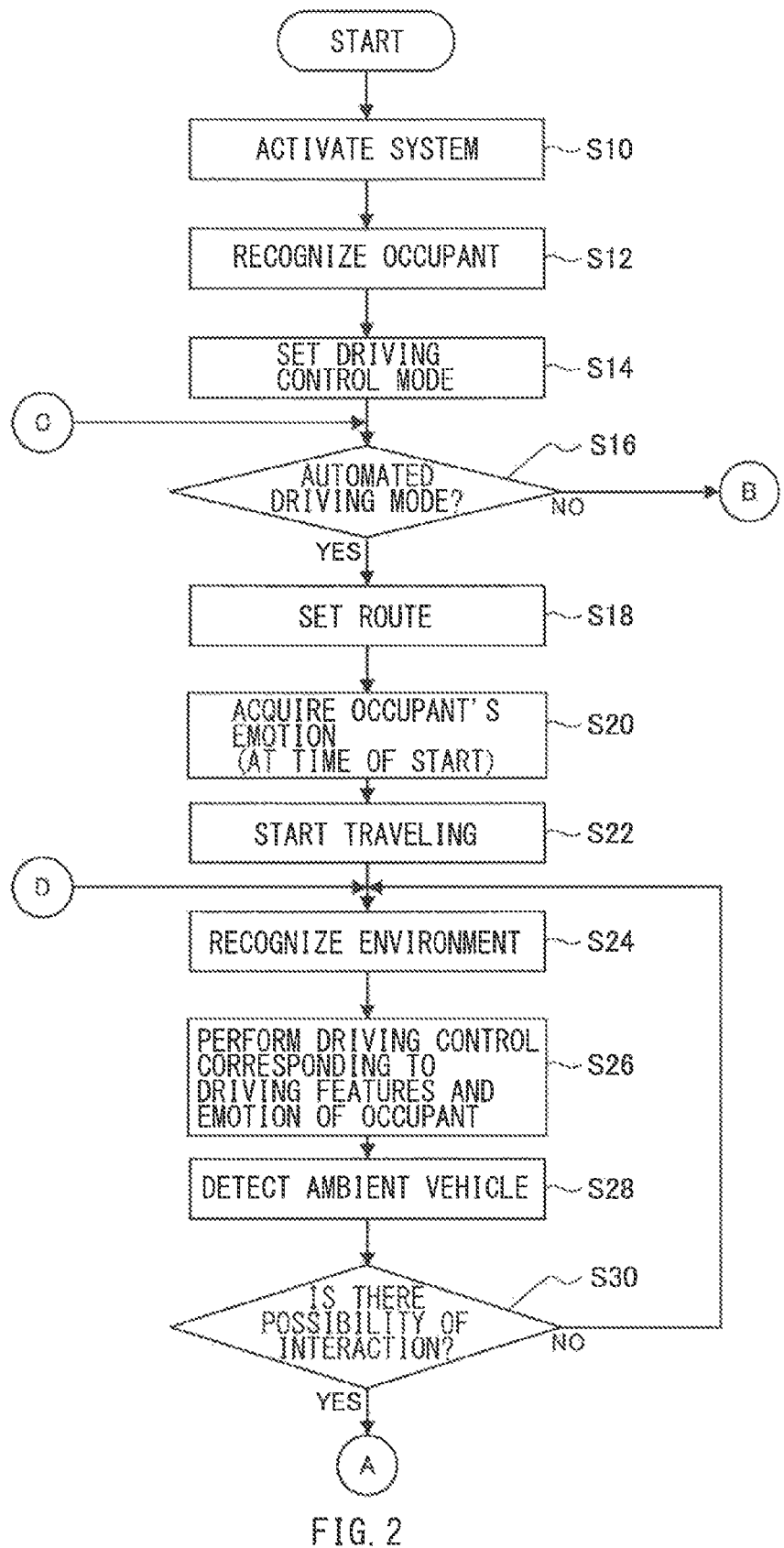
FIG. 2 is a flowchart illustrating a process that is performed in the vehicle traveling control system.
Figure 3:
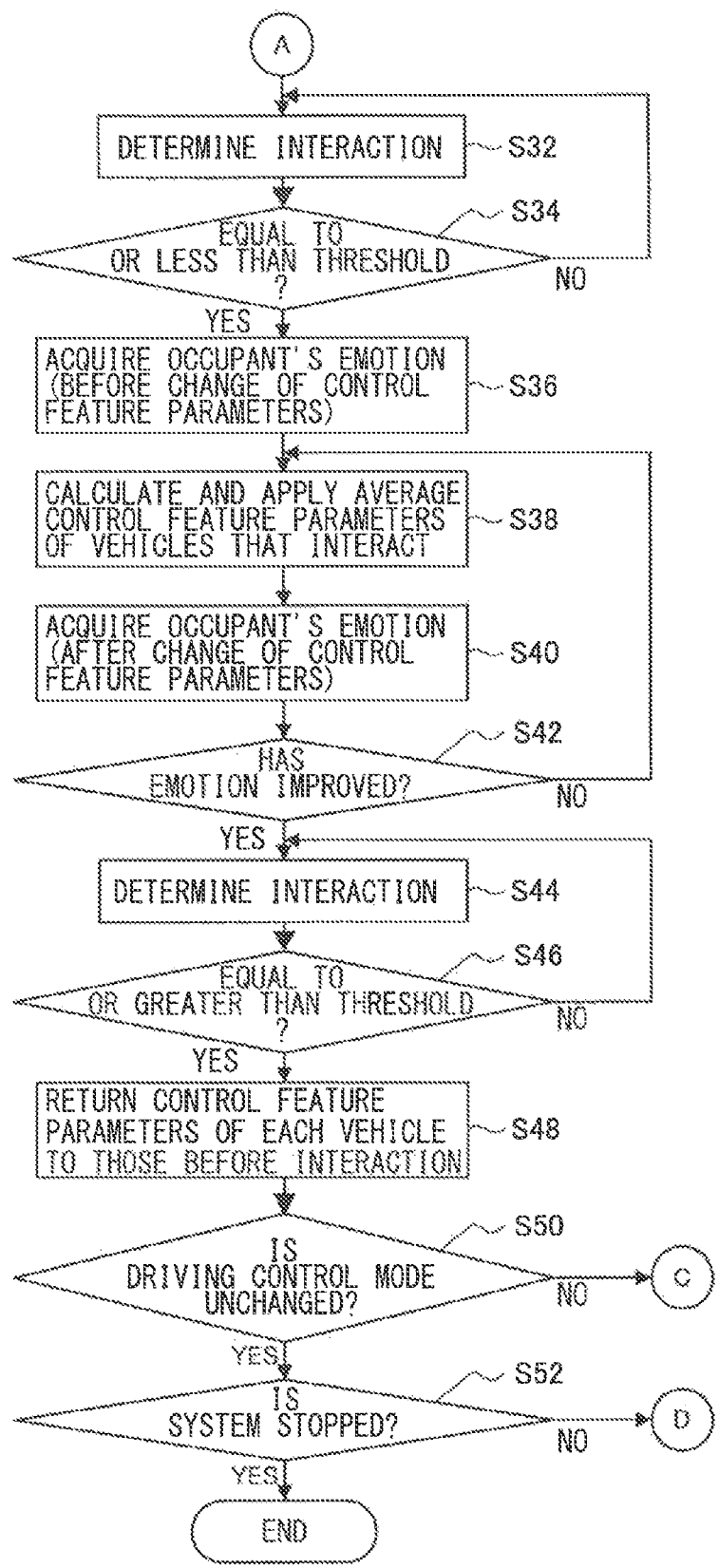
FIG. 3 is another flowchart illustrating the process that is performed in the vehicle traveling control system.
Figure 4:
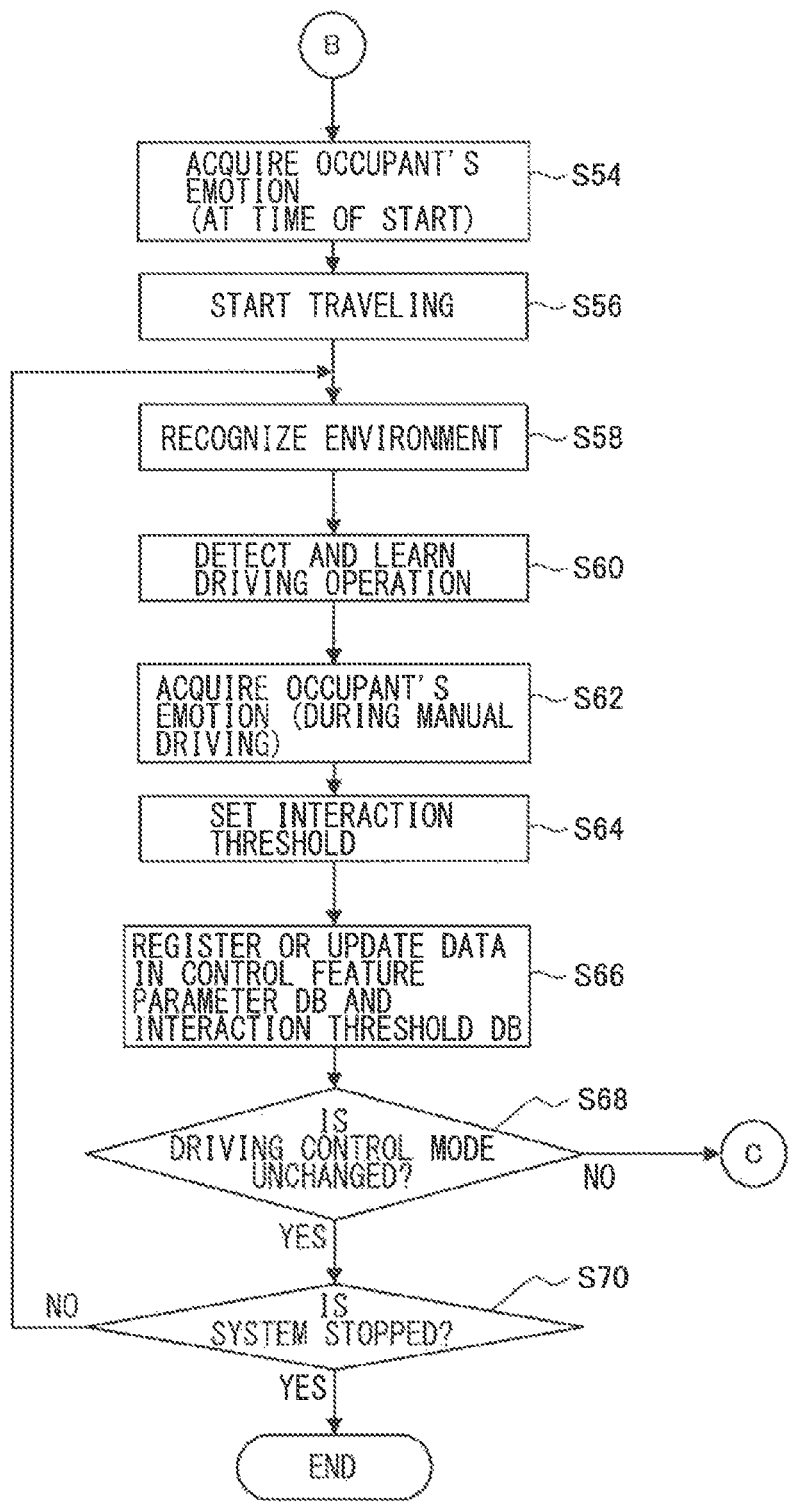
FIG. 4 is another flowchart illustrating the process that is performed in the vehicle traveling control system.

FIGS. 2 to 4 are flowcharts illustrating a process that is performed in the vehicle traveling control system 1000. First, in step S10, the occupant may activate the system. Thereafter, in step S12, the occupant recognition sensor 200 may recognize the occupant. As an example of a recognition method, the occupant may be discriminated from a facial image of a driver monitoring system (DMS), for example, using a camera. As another example, response may be made using a microphone, in response to an inquiry made from the vehicle traveling control system 1000 via a speaker.

Thereafter, in step S14, the traveling control mode switcher 100 may perform setting of the driving control mode. In a case of a vehicle that is able to perform automated driving, a manual driving mode and an automated driving mode may be assumed as two types of the traveling control mode. At a stage where the occupant goes on board the vehicle and activates the vehicle traveling control system 1000, the occupant may select either of the manual driving mode and the automated driving mode. Switching may occur during traveling. The driving control mode may be set via input by the occupant to the control setting interface 300, such as a touch panel, and the traveling control mode switcher 100 may switch the mode.

Thereafter, in step S16, the traveling control mode switcher 100 may determine whether the traveling control mode is the automated driving mode, and in a case where the traveling control mode is the manual driving mode ("NO" in step S16), the flow may proceed to step S54 in FIG. 4. A case where the vehicle is operated by manual driving may serve as an opportunity of learning driving operation characteristics (driving characteristics) of a person who performs driving operation (a driver). Description will be given on a learning phase that is performed in step S54 and subsequent steps.

In step S54, the occupant emotion acquisition unit 160 may acquire the occupant's emotion. When traveling is started by the manual driving, or when the traveling control mode is switched from the automated driving mode to the manual driving, the occupant emotion acquisition unit 160 may acquire emotions of occupants (a driver and a passenger). One reason for acquiring the emotion at this stage is to sense the initial emotion when driving is started or when the driving control mode is changed, thereby making it possible to continuously sense a change in emotion (e.g., whether the emotion changes from negative to positive) in the subsequent manual driving mode.

The occupant emotion acquisition unit 160 may acquire the occupant's emotion from information acquired from the bio-sensor 700 or information recognized by the occupant recognition sensor 200. It is to be noted that the occupant emotion acquisition unit 160 may acquire the occupant's emotion from equipment such as a smartphone. Examples of the information detected by these sensors may include brain waves, cerebral blood flow, blood pressure, perspiration, an electrocardiogram, a heart rate, eye movement, a pupil diameter, line-of-sight motion, and the number of blinks. The occupant emotion acquisition unit 160 may estimate the occupant's emotion by using these pieces of information. As an example, in a case where the blood pressure or the heart rate increases from an initial value, it is estimable that the occupant is excited and offended. In a case where an amount of perspiration increases from an initial value, it is estimable that the occupant is offended. It is also possible to estimate the occupant's emotion by acquiring speech contents and speech volume of the occupant, and analyzing the speech contents or the speech volume. For example, in a case where unusual wording is used or the speech volume is larger than usual, it is estimable that the occupant is offended.

Thereafter, in step S56, the vehicle may be manually operated by the driver to start traveling. Thereafter, in step S58, the ambient environment determination unit 110 may recognize an ambient environment by the ambient environment sensor 400 to take into consideration the ambient environment. For example, the ambient environment determination unit 110 may recognize and take into consideration the ambient environment by using information obtained from a front and rear camera or a front and rear laser radar included in the ambient environment sensor 400, or from information such as position information or map information obtained from the navigation apparatus 600. In one example, the ambient environment determination unit 110 is able to use a pair of left and right stereo images that have been captured by the pair of left and right cameras of the stereo camera included in the ambient environment sensor 400, and generate and acquire distance information indicating a distance to a target from an amount of discrepancy between corresponding positions by the principle of triangulation. At the same time, the ambient environment determination unit 110 is able to acquire position information of a subject from image information. The ambient environment determination unit 110 may perform known grouping on the distance information generated by the principle of triangulation, and compare the grouped distance information with preset three-dimensional solid object data, for example, thereby detecting data such as solid object data or sign data on a road surface. This enables the ambient environment determination unit 110 to also recognize a person, another vehicle, a stop sign, a stop line, or a gate of an electronic toll collection (ETC) system, for example. The ambient environment determination unit 110 is also able to, by using the distance information regarding a person or another vehicle generated by the principle of triangulation, calculate an amount of change in distance or a relative speed to the person or the other vehicle. It is possible to obtain the amount of change in distance by integrating a distance between frame images detected for each unit time. It is possible to obtain the relative speed by dividing a distance detected for each unit time by the unit time. It is to be noted that a technique described in JP-A No. 2015-89801 mentioned above may also be applied to the recognition of the ambient environment, as appropriate.

Thereafter, in step S60, while the vehicle is traveling, the driving operation learning unit 120 may detect what kind of operation the driver performs in the recognized ambient environment, via the vehicle operation sensor 500 (e.g., an accelerator position sensor or a steering angle sensor), and may learn the driving operation. A learning result may be stored, as control feature parameters of the driver, in the control feature parameter DB 140.

Description will be given on a method of extracting the driving operation characteristics (driving characteristics) of the driver from a combination of the detected driving operation and the ambient environment. Various researches have been made on individual driving operation that differs depending on situation. Here, description will be given on the basis of driving operation models described in NPTL 1 mentioned above. Models at the time of starting acceleration and at the time of traveling on a curve are taken as examples.

According to NPTL 1, in starting acceleration from a vehicle halt state (or a low-speed traveling state), a period length $t_{obj}$ from start to end of acceleration (until a desired speed is reached) may be represented by the following expression (1).

$$t_{obj} = \frac{v_{obj} - v_o}{a} \qquad (1)$$

Here, $v_{obj}$ indicates the desired speed after acceleration, and may be restricted by individual preference, a road shape, speed limits, or a speed of a preceding vehicle or an ambient vehicle, for example. Accordingly, $v_{obj}$ may be collected for each situation before learning of the driving operation during the manual driving, and may be known here. In addition, $v_o$ indicates a vehicle speed at the start of acceleration, and a indicates an average acceleration. To further represent transient response of the vehicle speed, the vehicle speed and a feedback gain during acceleration may be changed according to the following expressions (2) and (3).

$$v = \frac{v_{obj}}{k} \qquad (2)$$

$$\text{gain} = \begin{cases} \dfrac{-\log(1-k)}{t_{obj}} & (v < v_{obj}) \\ 0 & (v > v_{obj}) \end{cases} \qquad (3)$$

Here, k may be a parameter indicating a difference in transient response of acceleration, and may have a value in a range of (0, 1). According to the above description, by applying the expressions (2) and (3) to vehicle speed time-series data during the manual driving and performing parameter fitting, it is possible to acquire $v_{obj}$ and k indicating individual features at the time of acceleration in a certain situation. As control feature parameters, $v_{obj}$ and k may be stored in the control feature parameter DB 140, together with information such as corresponding ambient environment information, vehicle operation information, or occupant's emotion at the timing.

According to NPTL 1, there has been proposed a steering model including forward and backward vehicle speed adjustment at the time of traveling on a curve. In other words, in the model, the driver may perform steering in response to a position error between a look-ahead point and a desired track at the time of turning. Here, a distance L to the look-ahead point may be represented by the following expression (4), from driver-specific preview time $T_p$ and a vehicle speed v at the time of turning.

$$L = T_p v \qquad (4)$$

On the assumption that the speed v at the time of turning depends on a curve curvature c and an allowable lateral acceleration $a_y$, the speed v at the time of turning may be collected for each ambient situation, such as the curve curvature, before learning of the driving operation during the manual driving, and may be known here. A steering gain G may be represented by the following expression (5).

$$G = \frac{2nl}{(T_p v)^2} \qquad (5)$$

Here, n indicates a total gear ratio of a steering system, and l indicates a wheelbase. By applying the expression (5) to a preview/prediction control model described in NPTL 2 and performing parameter fitting, v and $T_p$ indicating individual characteristics of the driver at the time of traveling on a curve may be obtained. As control feature parameters, v and $T_p$ may be stored in the control feature parameter DB 140, together with corresponding ambient environment information.

In addition to the above examples, various models have been proposed for various situations. In this manner, it is possible to extract driver-specific characteristics (feature values) of driving operation in various situations. The extracted features may be stored in the control feature parameter DB 140. It is to be noted that, a technique of converting a driving characteristic itself into a mathematical function as described in WO 2017/057060 may be adopted. In this case, subsequent averaging operation may be performed on the mathematical function.

It is to be noted that the obtained control feature parameters may be uploaded to the server 2000 via the communication apparatus 800 to be used for average control feature parameter calculation (described later).

In this manner, the driving operation learning unit 120 may extract the driving characteristics (control feature parameters associated with an individual). Thereafter, in step S62, the occupant emotion acquisition unit 160 may acquire the occupant's emotion for the following two example purposes. The first purpose may be to determine interaction with another vehicle (described later), and the second purpose may be to acquire how the occupant (driver or passenger) feels about manual operation.

In regard to the above second purpose, in a case where the driver's emotion worsens, there is a possibility that the operation is performed regardless of the driver's own intention. For example, a case where the driver suddenly brakes upon sudden cutting-in is assumable. Such operation includes individual features, but the features need not be reproduced actively and therefore need not be reflected during the automated driving mode (as long as it is possible for a vehicle system to provide a safer and more reliable method).

In a case where the passenger's emotion worsens, it seems that the passenger does not prefer the driving operation characteristics (driving characteristics) of the driver. In a case where emotion improves, it seems that the passenger perceives the driving operation characteristics (driving characteristics) of the driver as favorable. Therefore, in a case where the passenger does not drive and does not have the control feature parameters, emotion response of the passenger to the driving characteristics of the driver may be regarded as driving characteristics of the passenger (e.g., favorable parameters of the driver may be adopted as control feature parameters of the passenger).

Thereafter, in step S64, on the basis of the occupant's emotion during the manual driving, the interaction threshold decision unit 130 may decide a threshold for interaction with another vehicle. Interaction with another vehicle refers to a state in which, when the vehicle is traveling in the automated driving mode reflecting the driving characteristics of the occupant, becoming closer to another vehicle makes it necessary to change vehicle control.

For example, in a situation in which the own vehicle is cruising at a constant speed of 60 km/h by the automated driving on a straight road with one lane for each direction, and the occupant of the own vehicle prefers 60 km/h, assume a case where another vehicle traveling at 40 km/h is present ahead, and an occupant of the other vehicle prefers 40 km/h. In a case where a distance between the vehicles is gradually becoming closer, collision will occur if the vehicles keep traveling without changing control. Accordingly, the speed may be changed to avoid collision when the distance decreases to a certain distance. Assuming a case where the own vehicle (the subsequent vehicle) decelerates, the occupant may feel fear, anxiety, or discomfort, depending on a distance or timing at which deceleration is started. This can occur when, for example, deceleration takes place after becoming closer to the other vehicle (the preceding vehicle) than the occupant has expected. In such a case, deceleration may have to be started earlier.

A similar situation occurs also during the manual driving. Therefore, characteristics of the occupant may be sensed at that occasion. In other words, if the above-described example of cruise control is performed during the manual driving, the occupant may feel fear, anxiety, or discomfort depending on driver operation. Accordingly, by repeatedly experiencing various situations, it is possible to learn a distance at which each occupant does not feel fear, for example. Therefore, it is possible to set, as an interaction threshold, a value that includes a margin in addition to the distance and is associated with information obtained from emotion acquisition. The interaction threshold may be, for example, a distance. Thus, during the automated driving, it is possible to start deceleration of the own vehicle at appropriate control change timing, e.g., timing at which the distance to the preceding vehicle becomes the interaction threshold. It is to be noted that a value of the interaction threshold may be set to a predetermined initial value at the time of vehicle shipping, and may be kept uniform without being changed depending on a history of the manual driving.

Figure 5:
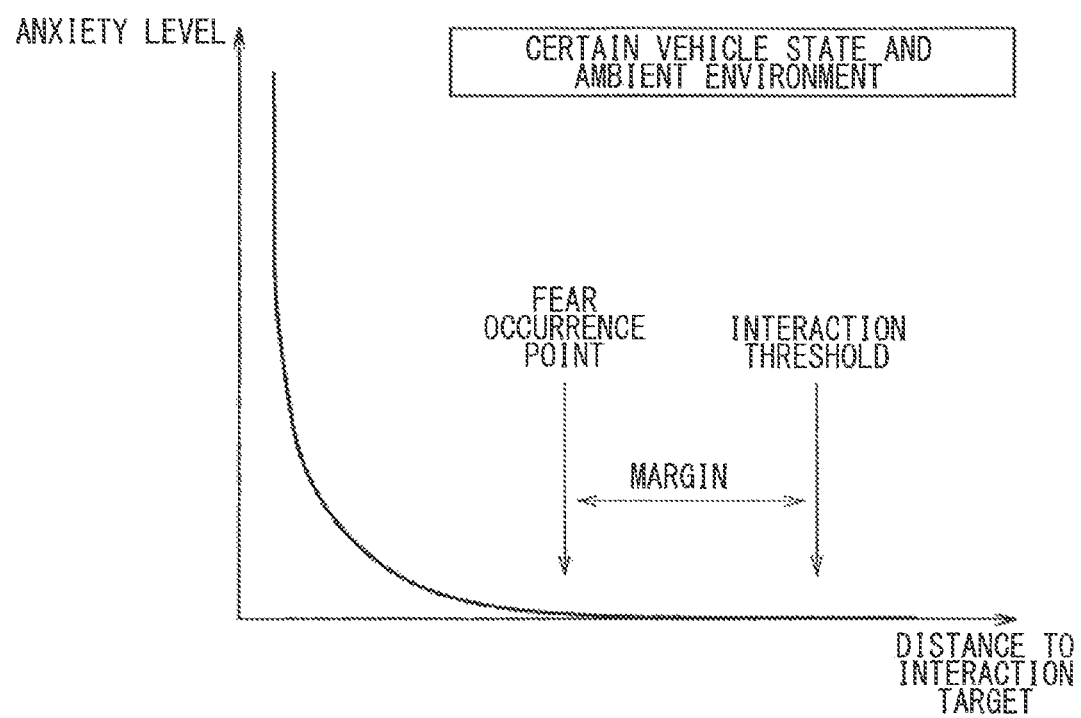
FIG. 5 is a schematic diagram illustrating a method of deciding an interaction threshold.

FIG. 5 is a schematic diagram illustrating a method of deciding the interaction threshold. Here, a value related to interaction may be the distance to the preceding vehicle (interaction target). FIG. 5 illustrates a relationship between the distance to the preceding vehicle as the interaction target (horizontal axis), and an anxiety level of the occupant (vertical axis). As illustrated in FIG. 5, the smaller the distance to the interaction target becomes, the larger the anxiety level of the occupant becomes. A distance of a fear occurrence point as illustrated in FIG. 5 may be found by acquiring the anxiety level of the occupant associated with the distance to the preceding vehicle during the manual driving. It is possible to set, as the interaction threshold, a value including a margin in addition to the distance of the fear occurrence point. The decided interaction threshold may be stored in the interaction threshold DB 150. The interaction threshold may be shared with another vehicle via the communication apparatus 800.

The above example describes the inter-vehicle distance as an example of a parameter in determining interaction, but it is possible to use various parameters besides the inter-vehicle distance. For example, the anxiety level of the occupant may differ depending on factors such as a road width of a road, the number of parked vehicles parked at a road shoulder, the number of pedestrians (traffic), a curvature of a curve, a road surface situation (dry or wet), weather, or a time. The anxiety level of the occupant may also differ depending on vehicle operation during the manual driving. In setting the interaction threshold, the interaction threshold may be set in association with these factors (ambient environment information and vehicle operation information). The interaction threshold associated with the ambient environment information and the vehicle operation information may be stored in the interaction threshold DB 150.

It is to be noted that a target of interaction may be several preceding and subsequent vehicles on the same lane, and several vehicles on left and right lanes (including forward and backward directions). For example, the target may be vehicles within about 20 meters in front of and behind the vehicle and vehicles within about 5 meters on the left and right of the vehicle.

As described above, the driving characteristics (control feature parameters) in a certain situation, and the occupant's emotion and the interaction threshold associated with the characteristics have been acquired. Thereafter, in step S66, the vehicle traveling control system 1000 may register these in the control feature parameter DB 140 and the interaction threshold DB 150 for use during the automated driving.

The control feature parameters, the occupant's emotion, and the interaction threshold are expected to reflect more intrinsic characteristics of the driver as the learning is repeated, and therefore may be updated by taking a cumulative average, for example.

The learning during the manual driving may be performed by the above-described process. In a case where the driving control mode is kept at the manual driving mode ("YES" in step S68) and the system is not stopped ("NO" in step S70), the flow may return to step S58, and this process may be repeated. This process may end when the driving control mode is switched to the automated driving mode in the determination in step S68 ("NO" in step S68), and process contents may shift to step S16 in FIG. 2. Alternatively, this process may end in a case where the vehicle system shifts to the halt state in the determination in step S70 ("YES" in step S70).

Now, description will be given on a driving characteristic reflection phase during the automated driving. In a case where the vehicle is set to the automated driving mode, the vehicle traveling control system 1000 may perform vehicle traveling control according to the control feature parameters acquired during the manual driving. The following description describes a technique that makes it possible to cooperatively control a plurality of vehicles under the automated driving mode in a case where the vehicles are present at positions that may allow interaction.

First, in a case where the driving control mode is determined to be the automated driving mode in step S16 in FIG. 2 ("YES" in step S16), the flow may proceed to step S18. In step S18, route setting may be performed. If a destination is set with the navigation apparatus 600, the navigation apparatus 600 may present a plurality of traveling routes from viewpoints such as a distance, necessary time, the occupant's preference, or a traffic situation. A route may be set from among a plurality of candidate routes by the occupant selecting a route or by the system selecting a suitable route.

While information of the traveling route is modified depending on a change in situation, the vehicle may travel by taking into consideration a route from the current location to a goal. This route information may be used in determining interaction between vehicles (described later). Accordingly, the route information may be transmitted to the server 2000 to be transmitted to another vehicle via the server 2000. The route information may be transmitted to another vehicle by inter-vehicle communication. Thus, the vehicles may share the route information with each other.

Thereafter, in step S20, the occupant emotion acquisition unit 160 may acquire the occupant's emotion before starting traveling. The acquisition before traveling makes it possible to sense an emotion initial value at the time of starting traveling. Thereafter, in step S22, the vehicle may start traveling by automated driving control reflecting occupant characteristics. Thereafter, in step S24, the ambient environment determination unit 110 may recognize and take into consideration the ambient environment by a technique similar to that in step S56 in FIG. 4.

Thereafter, in step S26, the vehicle traveling control system 1000 may perform driving control corresponding to the driving characteristics and the emotion of the occupant. The driving characteristics in a certain situation and the occupant's emotion associated with the driving characteristics may have been obtained from the learning during the manual driving. During the automated driving, traveling control that made the occupant's emotion favorable (or neutral) may be achieved on the basis of the driving operation models and the control feature parameters. As described above, the control feature parameters may be stored in association with information such as the ambient environment information, the vehicle operation information, or the occupant's emotion in the control feature parameter DB 140. Thus, for the ambient environment recognized in step S24, it is possible to extract the control feature parameters associated with the most favorable emotion from the control feature parameter DB 140. By performing the automated driving according to the extracted control feature parameters, it is possible for the vehicle traveling control system 1000 to make the occupant's emotion favorable.

Thereafter, in step S28, an ambient vehicle may be detected. The interaction determination unit 170 may determine whether interaction with another automated driving vehicle occurs, during execution of the automated driving mode.

Figure 6:
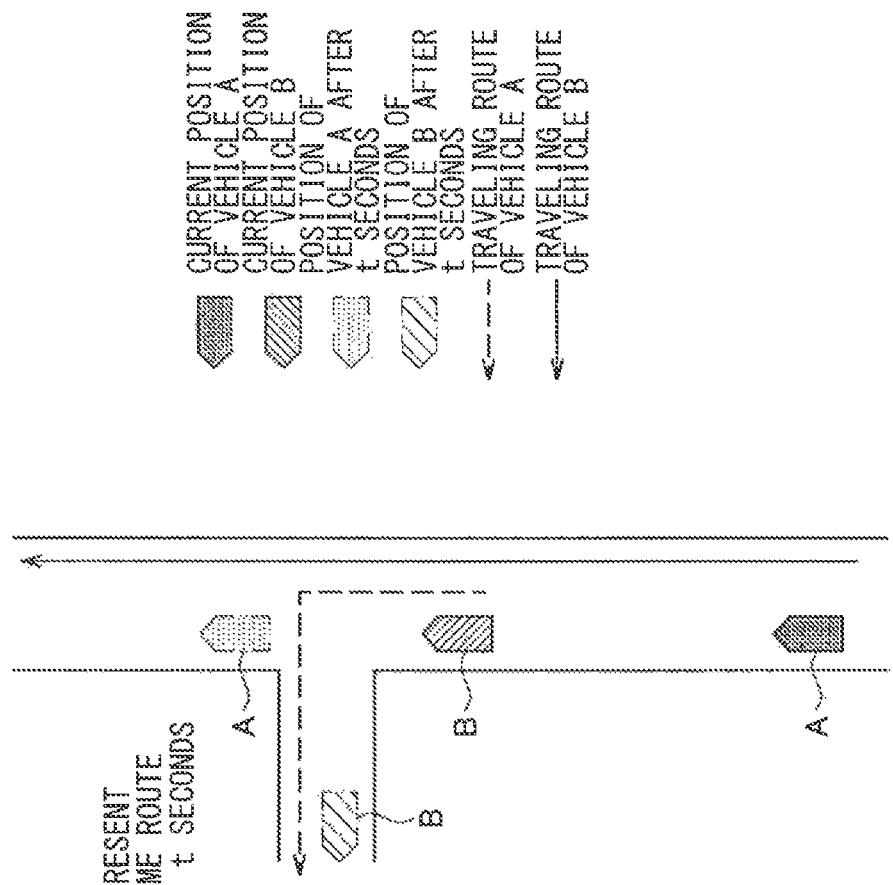
FIG. 6 is a schematic diagram illustrating a technique of determining whether vehicles may interact with each other.
Figure 6:
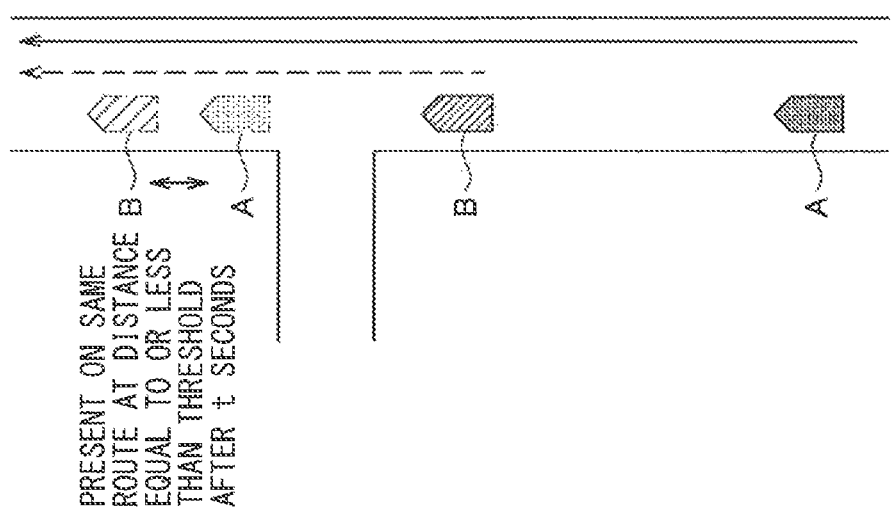

In one example, first, the interaction determination unit 170 may determine whether vehicles may interact with each other by referring to route information possessed by each vehicle. FIG. 6 is a schematic diagram illustrating a technique of determining whether the vehicles may interact with each other. FIG. 6 assumes a case where a vehicle A and a vehicle B are traveling on a straight road having a road branching left, and illustrates a case where interaction occurs on the left and a case where no interaction occurs on the right.

For example, assume a situation in which the own vehicle (vehicle A) is approaching at a faster speed from behind the preceding vehicle (vehicle B) on the same lane. As illustrated on the left of FIG. 6, in a case where the vehicles take the same route, it may be predicted that the inter-vehicle distance soon reaches the interaction threshold. In such a state, the preceding vehicle (vehicle B) may be detected as a vehicle (ambient vehicle) that may interact with the own vehicle (vehicle A).

As illustrated on the right of FIG. 6, in a case where the vehicle A and the vehicle B do not take the same route and the vehicle B takes a route turning left at the branch point, the inter-vehicle distance may not reach the interaction threshold. In such a state, the preceding vehicle (vehicle B) may be detected as a vehicle (ambient vehicle) that does not interact with the own vehicle (vehicle A).

A condition in determining whether the vehicles may interact with each other may be whether the vehicles become closer to reach an interaction distance after "t" seconds. It is possible to determine this by referring to a relative speed and a relative distance on the routes of the vehicles, if information of the two vehicles is shared. Here, "t" may be individually set by a user, or may be set in advance by a manufacturer. If the distance between the vehicles is equal to or greater than the interaction threshold after "t" seconds, it may be determined that no interaction occurs. Information of the two vehicles (e.g., a vehicle speed, an acceleration, or a relative distance on the routes) may be shared by communication via the server 2000 or inter-vehicle communication.

Thereafter, in step S30, the interaction determination unit 170 may determine whether there is possibility of interaction. In a case where there is possibility of interaction ("YES" in step S30), the flow may proceed to step S32 in FIG. 3. In a case where there is no possibility of interaction ("NO" in step S30), the flow may return to step S24.

If interaction determination in step S32 is performed for all other vehicles, processing load for the interaction determination can increase. In contrast, it is possible to significantly reduce the processing load by performing the interaction determination for only vehicles that may interact with each other, on the basis of the route information of each vehicle.

In step S32 in FIG. 3, the interaction determination unit 170 may perform the interaction determination by using the interaction threshold decided during the manual driving. At this occasion, the interaction threshold associated with the ambient environment information may be stored in the interaction threshold DB 150. Therefore, the corresponding interaction threshold may be applied on the basis of the information of the ambient environment obtained in step S28. This makes it possible to shift to cooperative control for vehicles that interact with each other, depending on the ambient environment information, without causing the occupant to feel anxiety. Description will be given on the interaction determination, taking the distance between the own vehicle and the preceding vehicle as an example. In a case where the distance between the own vehicle and the preceding vehicle is equal to or less than the interaction threshold in step S34 ("YES" in step S34), the flow may thereafter shift to step S36. In a case where the distance between the own vehicle and the preceding vehicle is not equal to or less than the interaction threshold ("NO" in step S34), the flow may return to step S32, and the determination by the interaction threshold may be continued. It is to be noted that, in a case where the own vehicle and the preceding vehicle have different interaction thresholds, it is possible to adopt the threshold by which it is more likely to be determined that interaction occurs. For example, in a case where the interaction threshold of the own vehicle is an inter-vehicle distance of 30 meters and the interaction threshold of the preceding vehicle is an inter-vehicle distance of 20 meters, it is possible for the interaction determination unit 170 to perform the interaction determination by using the interaction threshold of the own vehicle by which it is more likely to be determined that interaction occurs. In this case, if the interaction determination condition of the own vehicle holds, information indicating that may be transmitted to the other vehicle. Thus, the interaction determination condition may hold also for the other vehicle, and both of the vehicles may start the cooperative control.

In step S36, before change of the control feature parameters by the cooperative control (described later), the occupant emotion acquisition unit 160 may acquire the occupant's emotion (level) to sense the occupant's emotion, for the following two example purposes to be achieved in subsequent steps: (1) to apply restrictive feedback to the parameter change; and (2) to perform weighting calculation of the control feature parameters depending on a change in the emotion level. Both of the purposes will be described later.

Thereafter, in step S38, average control of the plurality of vehicles that interacts may be performed. In one example, the control feature parameter acquisition unit 175 may acquire, via the communication apparatus 800, control feature parameters of the plurality of vehicles that interacts (including the own vehicle). The average control feature parameter calculator 180 may calculate average control feature parameters, and apply the average control feature parameters to the plurality of vehicles. The vehicles that interact with each other may share the average control feature parameters between the vehicles. As an example of a sharing method, each vehicle may acquire the average control feature parameters uploaded onto the server 2000. As another example, the vehicles may communicate with each other by inter-vehicle communication. In the vehicles that interact with each other, the vehicle controller 185 may control the travel actuators 900 on the basis of the average control feature parameters. Thus, between the plurality of vehicles that interacts, the vehicle control may be performed according to common average control feature parameters (common control feature parameters).

The control feature parameters may be parameters reflecting driving characteristics of the driver, or may be values set by a manufacturer, for example. After the acquisition, the average control feature parameter calculator 180 may calculate an average value of the control feature parameters. Most simply, an arithmetic mean may be calculated.

On the basis of the emotion before the change of the control feature parameters, weighting may be performed with importance placed on the vehicle having the occupant with a bad emotion state. For example, assume a vehicle that is equipped with a system allowed to classify emotions into five levels for each of two types of emotions, i.e., positive emotions and negative emotions, and is able to perform the automated driving reflecting the driving characteristics of the occupant. In a situation in which two of such vehicles make start in line from the halt state, assume that an emotion level of the occupant of the subsequent vehicle is negative 3, and an emotion level of the occupant of the preceding vehicle is positive 2. At this occasion, the emotion levels of the occupants) may be expressed as 8 (=|−3−5|) for the subsequent vehicle and 3 (=|2−5|) for the preceding vehicle, with respect to positive 5 (the best emotion level). In a case of performing weighting, for example, on the basis of this, it is possible to calculate the average control feature parameters at the time of acceleration as in the following expressions (6) and (7).

$$v_{obj,ave} = \frac{3 \times v_{obj,front} + 8 \times v_{obj,rear}}{(3+8)} \quad (6)$$

$$k_{ave} = \frac{3 \times k_{front} + 8 \times k_{rear}}{(3+8)} \quad (7)$$

Here, $v_{obj,front}$ and $v_{obj,rear}$ respectively indicate desired vehicle speeds of occupant preference after acceleration of the preceding vehicle and the subsequent vehicle, and $k_{front}$ and $k_{rear}$ respectively indicate transient response parameters of the preceding vehicle and the subsequent vehicle. These values may be obtained in advance, as the control feature parameters, according to the above-described expressions (2) and (3). Consequently, it is possible to obtain average control feature parameters $v_{obj,ave}$ and $k_{ave}$ that are close to the control feature parameters of the subsequent vehicle.

Figure 7:
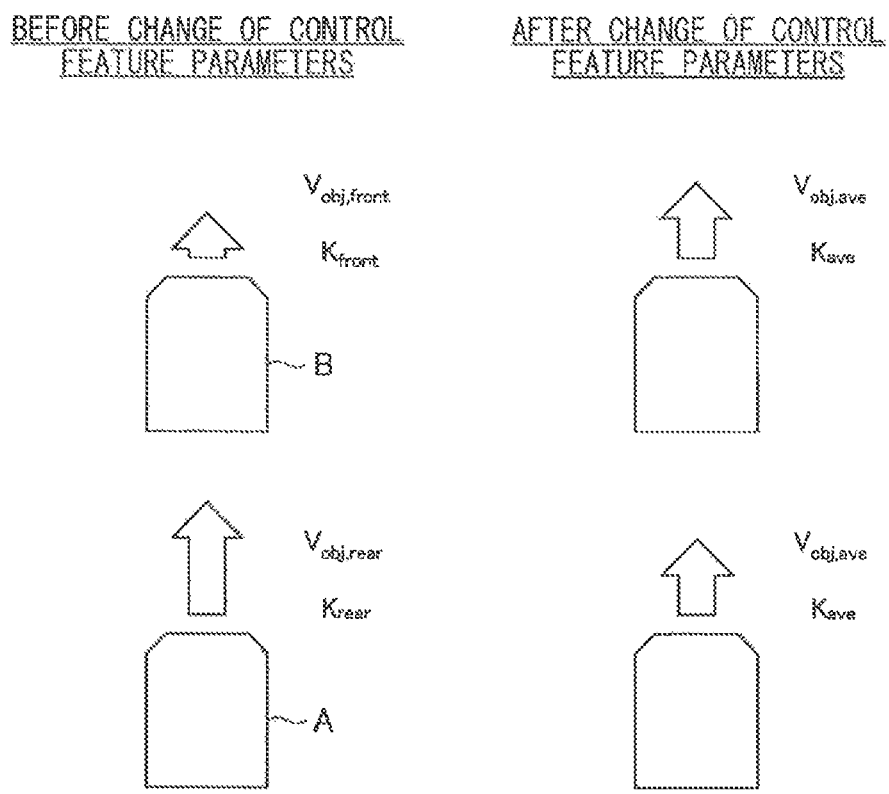
FIG. 7 is a schematic diagram illustrating states before and after change of control feature parameters.

FIG. 7 is a schematic diagram illustrating states before and after the change of the control feature parameters in the above example. Assume a situation in which the own vehicle (vehicle A) is approaching at a faster speed from behind the preceding vehicle (vehicle B). Before the change of the control feature parameters, the desired vehicle speed of the vehicle A may be $v_{obj,rear}$, and the desired speed of the vehicle B may be $v_{obj,front}$. The transient response parameter of the vehicle A may be $k_{rear}$, and the transient response parameter of the vehicle B may be $k_{front}$. After the change of the control feature parameters, the desired vehicle speed may be $v_{obj,ave}$ and the transient response parameter may be $k_{ave}$ for both the vehicle A and the vehicle B. Thus, it is possible to improve, as a whole, the emotions of the occupants of the vehicle A and the vehicle B.

At the time of traveling on a curve, assume a case where two vehicles are present at a distance that allows interaction and emotion states are similar to those mentioned above (the emotion level of the occupant of the subsequent vehicle is negative 3, and the emotion level of the occupant of the preceding vehicle is positive 2). In a case of performing weighting, for example, the average control feature parameters may be calculated by the following expressions (8) and (9).

$$v_{ave} = \frac{3 \times v_{front} + 8 \times v_{rear}}{(3+8)} \quad (8)$$

$$T_{p,ave} = \frac{3 \times T_{p,front} + 8 \times T_{p,rear}}{(3+8)} \quad (9)$$

Here, $v_{front}$ and $v_{rear}$ respectively indicate desired vehicle speeds of the preceding vehicle and the subsequent vehicle, and $T_{p,front}$ and $T_{p,rear}$ respectively indicate preview time of the preceding vehicle and the subsequent vehicle. These values may be obtained in advance, as the control feature parameters, according to the above-described expressions (4) and (5). Consequently, the average control feature parameters $v_{ave}$ and $T_{p,ave}$ that are close to the control feature parameters of the subsequent vehicle may be obtained.

In a case where a plurality of occupants is present, which occupant is to be targeted may be set. As an example of a setting method, the target may be set before traveling (e.g., the occupant seated in a driver's seat may be targeted). As another example, a person with the worst emotion level at the time may be targeted. Alternatively, an average value of all occupants of the vehicle may be used.

As a weighting method, information other than the occupant's emotion may be used. For example, a safe driving level of the occupant may be used as a variable. As a method of calculating the safe driving level, the safe driving level may be calculated on the basis of the number and frequency of traffic accidents or violations, daily driving operation (during manual operation), or an index set by a manufacturer, for example. In the above-described example, the occupant of the subsequent vehicle may be weighted heavily, and average control feature parameters that are close to the emotion of the occupant of the subsequent vehicle may be set. However, in a case of using the safe driving level, average control feature parameters that are close to the emotion of the occupant with a high safe driving level may be set.

The calculated average control feature parameters may be applied to the plurality of vehicles that interacts. Consequently, the control feature parameters may become the same between the vehicles that interact with each other. On the basis of the average control feature parameters, the travel actuators 900 of the vehicles that interact with each other may be driven. It is possible to perform cooperative traveling control, because the control feature parameters are the same for the vehicles that interact with each other.

In a case of reflecting the average control feature parameters in the vehicles that interact with each other, change of control can cause the occupant to feel discomfort. Therefore, when the change is made, information indicating the change may be announced in voice or may be displayed on a display.

Thereafter, in step S40, in the vehicles that interact with each other, the occupant emotion acquisition unit 160 may acquire an emotion state of the occupant after the change of the control feature parameters.

Thereafter, in step S42, the average control feature parameter calculator 180 may determine whether the emotion has improved. In a case where the occupant's emotion has improved ("YES" in step S42), the flow may thereafter proceed to step S44. In a case where the emotion has not improved or has worsened ("NO" in step S42), the flow may return to step S38, and the average control feature parameter calculator 180 may calculate average control feature parameters again depending on the emotion state.

In step S42, improvement determination of the occupant's emotion may be performed for the occupant targeted in calculating the average control feature parameters. The emotion improvement determination may be performed for the occupant with the worst emotion level. Alternatively, the emotion improvement determination may be performed on the basis of an average value of emotion levels of all occupants of the vehicle.

In the emotion improvement determination, a situation may occur in which an emotion of an occupant "a" of the vehicle A has improved but an emotion of an occupant "b" of the vehicle B has worsened, for example. In such a case, it is possible to regard that the emotion has improved if the emotion has improved as a whole in the vehicles that interact with each other. For example, in the above-described cruise control in which the emotion level of the occupant of the subsequent vehicle is negative 3 and the emotion level of the occupant of the preceding vehicle is positive 2, assume that the emotion level of the occupant of the subsequent vehicle becomes negative 1 and the emotion level of the occupant of the preceding vehicle becomes positive 2 after the parameter change. At this occasion, the emotion levels of the vehicles may be, with respect to positive 5, 6 (=|−1−5|) for the subsequent vehicle and 3 (=|2−5|) for the preceding vehicle. Thus, the emotion as a whole in the vehicles may be 11 (=8+3) before the change, and 9 (=6+3) after the change. In this case, it may be determined that the emotion has improved.

In a case of average control feature parameters corresponding to the safe driving level, no feedback based on the emotion state may be performed.

It is to be noted that, in a case where the emotion is greatly worsened by the change of the control feature parameters, the average control feature parameters may be regarded as driving characteristics disliked by the occupant, and may be avoided in subsequent control.

In step S44, the interaction determination unit 170 may perform the interaction determination. After reaching a situation in which a plurality of vehicles interacts (e.g., a situation in which the inter-vehicle distance falls below the interaction threshold), the vehicles may keep traveling to reach a situation in which they no longer interact with each other. For example, in a case where two vehicles have been traveling in line on the same lane, but one vehicle deviates to another road depending on a destination, the interaction becomes absent.

Whether the interaction has become absent may be determined from the interaction threshold, as in step S34. In a case where the inter-vehicle distance is equal to or greater than the interaction threshold in step S46 ("YES" in step S46), the flow may thereafter proceed to step S48, and the control feature parameters may be returned to those before the interaction, because the interaction has become absent. Thus, driving according to feature parameters of the driving operation of the vehicle occupant may be performed. Announcement may be made when the control feature parameter are returned to those before the interaction. In a case where the inter-vehicle distance is not equal to or greater than the interaction threshold in step S46 ("NO" in step S46), the flow may return to step S44, and the determination by the interaction threshold may be continued.

The control during the automated driving may be performed by the above-described process. In a case where the driving control mode is kept at the automated driving mode ("YES" in step S50) and the system is not stopped ("NO" in step S52), the flow may return to step S24 in FIG. 2, and this process may be repeated. This process may end when the driving control mode is switched to the manual driving mode in the determination in step S50 ("NO" in step S50), and process contents may shift to step S16 in FIG. 2. Alternatively, this process may end in a case where the vehicle system shifts to the halt state in the determination in step S52 ("YES" in step S52).

The above description describes, as an example, the vehicle control performed by the vehicle traveling control system 1000 provided in the vehicle. However, some or all elements of the vehicle traveling control system 1000 may be provided in an external server (cloud). In that case, the server may perform processes such as learning of the driving operation, acquisition of the control feature parameters, decision of the interaction threshold, determination of interaction, or calculation of the average control feature parameters.

As described above, according to the example embodiment, it is possible to achieve cooperative traveling control under a condition where interaction occurs, while achieving the automated driving reflecting the driving characteristics of the occupant under a condition where no interaction occurs. This makes it possible to avoid or suppress frustration, anxiety, or discomfort of the occupant.

Before the occupant feels a negative emotion such as anxiety or discomfort, adjustment of the control feature parameters (calculation and application of the average control feature parameters) may be performed at a point in time when it is determined that interaction occurs. This makes it possible to prevent the occupant from having a negative emotion.

Even if the occupant is not prevented from having a negative emotion, sensing each vehicle occupant's emotion and feeding it back to generation of the average control feature parameters enables flexible control in response to the emotion state at the time.

In generating the average control feature parameters, reflecting the safe driving level of each vehicle occupant makes it possible to achieve safer traveling control when a plurality of automated driving vehicles interacts.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

According to the aspect of the technology, it is possible to perform more suitable automated driving, depending on driving characteristics of respective occupants of a plurality of vehicles.

The vehicle traveling control system 1000 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle traveling control system 1000. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the vehicle traveling control system 1000 illustrated in FIG. 1.

The invention claimed is:

1. A vehicle control apparatus comprising:
   an interaction determination unit configured to determine, based on a preset interaction threshold, that there is a possibility that a first vehicle and a second vehicle interact with each other while the first vehicle and the second vehicle are under an automated driving mode;
   an occupant emotion acquisition unit configured to acquire an emotion of an occupant of the first vehicle and an emotion of an occupant of the second vehicle; and
   a vehicle controller configured to perform vehicle control of travel actuators of the first vehicle, on a basis of the emotion of the occupant of the first vehicle and the emotion of an occupant of the second vehicle,
   wherein the emotion of the occupant of the first vehicle is associated with an ambient environment of the first vehicle traveling under a manual driving mode,
   wherein the emotion of the occupant of the second vehicle is associated with an ambient environment of the second vehicle traveling under the manual driving mode, and
   wherein the preset interaction threshold is set based on the emotion of the occupant of the first vehicle, the emotion of the occupant of the second vehicle, or both.

2. The vehicle control apparatus according to claim 1, wherein the vehicle control comprises cooperative control of the first vehicle and the second vehicle.

3. The vehicle control apparatus according to claim 1, further comprising:
   a control feature parameter acquisition unit configured to acquire a control feature parameter of the first vehicle and a control feature parameter of the second vehicle; and
   a common control feature parameter calculator configured to calculate a common control feature parameter, on a basis of the control feature parameter of the first vehicle and the control feature parameter of the second vehicle,
   wherein the vehicle controller is configured to control the first vehicle on a basis of the common control feature parameter.

4. The vehicle control apparatus according to claim 3, wherein the control feature parameter of the first vehicle comprises a parameter indicating a driving characteristic of the occupant of the first vehicle, and
   wherein the control feature parameter of the second vehicle comprises a parameter indicating a driving characteristic of the occupant of the second vehicle.

5. The vehicle control apparatus according to claim 1, further comprising an ambient environment determination unit configured to determine the ambient environment of the first vehicle and the ambient environment of the second vehicle,
   wherein the interaction determination unit is configured to determine that the first vehicle and the second vehicle interact with each other based on the preset interaction threshold corresponding to the ambient environment of the first vehicle and the ambient environment of the second vehicle.

6. The vehicle control apparatus according to claim 3, wherein the common control feature parameter calculator is configured to calculate the common control feature parameter by weighting the control feature parameter of the first vehicle and the control feature parameter of the second vehicle based on the emotion of the occupant of each of the first vehicle and the emotion of the occupant of the second vehicle.

7. The vehicle control apparatus according to claim 6, wherein the common control feature parameter calculator is configured to calculate the common control feature parameter to improve the emotion of the occupant of the first vehicle and the emotion of the occupant of the second vehicle based on the emotion of the occupant of the first vehicle and the emotion of the occupant of the second vehicle.

8. The vehicle control apparatus according to claim 6, wherein the common control feature parameter calculator is configured to bring the common control feature parameter closer to a control feature parameter of a vehicle having a worse emotion level, out of the first vehicle and the second vehicle.

9. The vehicle control apparatus according to claim 6, wherein
the occupant emotion acquisition unit is configured to estimate the emotion of the occupant of the first vehicle before and after the vehicle control reflecting the common control feature parameter,
the occupant emotion acquisition unit is configured to estimate the emotion of the occupant of the second vehicle before and after the vehicle control reflecting the common control feature parameter, and
the common control feature parameter calculator is configured to calculate the common control feature parameter to prevent the emotion of the occupant of the first vehicle and the emotion of the occupant of the second vehicle from worsening between before and after the vehicle control, on a basis of the emotion of the occupant of the first vehicle and the emotion of the occupant of the second vehicle estimated before and after the vehicle control.

10. The vehicle control apparatus according to claim 3, wherein the common control feature parameter calculator is configured to calculate the common control feature parameter by weighting the control feature parameter of the first vehicle and the control feature parameter of the second vehicle based on a safe driving level of the occupant of the first vehicle and a safe driving level of the occupant of the second vehicle.

11. The vehicle control apparatus according to claim 3, wherein
the control feature parameter of the first vehicle is calculated on a basis of a driving characteristic of the occupant of the first vehicle under the manual driving mode, and
the control feature parameter of the second vehicle is calculated one a basis a driving characteristic of the occupant of the second vehicle under the manual driving mode.

12. The vehicle control apparatus according to claim 11, wherein
the control feature parameter of the first vehicle is stored in advance in a database associated with the first vehicle, on a basis of the driving characteristic of the occupant of the first vehicle traveling under the manual driving mode and the ambient environment of the first vehicle traveling under the manual driving mode,
the control feature parameter of the second vehicle is stored in advance in a database associated with the second vehicle, on a basis of the driving characteristic of the occupant of the second vehicle traveling under the manual driving mode and the ambient environment of the second vehicle traveling under the manual driving mode, and
the control feature parameter acquisition unit is configured to acquire, on a basis of the ambient environment at a time when the interaction determination unit determines that there is the possibility that the first vehicle and the second vehicle interact with each other, the control feature parameter of the first vehicle corresponding to the ambient environment from the database associated with the first vehicle and the control feature parameter of the second vehicle corresponding to the ambient environment from the database associated with the second vehicle.

13. A vehicle control method comprising:
determining, based on a preset interaction threshold, that there is a possibility that a first vehicle a second vehicle interact with each other while the first vehicle and the second vehicle travel under an automated driving mode;
performing vehicle control of travel actuators of the first vehicle based on an emotion of an occupant of the first vehicle and an emotion of an occupant of the second vehicle; and
performing vehicle control of travel actuators of the second vehicle based on the emotion of the occupant of the first vehicle and the emotion of the occupant of the second vehicle,
wherein the emotion of the occupant of the first vehicle is associated with an ambient environment of the first vehicle traveling under a manual driving mode,
wherein the emotion of the occupant of the second vehicle is associated with an ambient environment of the second vehicle traveling under the manual driving mode, and
wherein the preset interaction threshold is set based on the emotion of the occupant of the first vehicle, the emotion of the occupant of the second vehicle, or both.

14. A non-transitory computer-readable medium storing a program that, when executed by a computer, causes the computer to implement a method, the method comprising:
determining, based on a preset interaction threshold, that there is a possibility that a first vehicle a second vehicle interact with each other while the first vehicle and the second vehicle travel under an automated driving mode;
performing vehicle control of travel actuators of the first vehicle based on an emotion of an occupant of the first vehicle and an emotion of an occupant of the second vehicle; and
performing vehicle control of travel actuators of the second vehicle based on the emotion of the occupant of the first vehicle and the emotion of the occupant of the second vehicle,
wherein the emotion of the occupant of the first vehicle is associated with an ambient environment of the first vehicle traveling under a manual driving mode,
wherein the emotion of the occupant of the second vehicle is associated with an ambient environment of the second vehicle traveling under the manual driving mode, and
wherein the preset interaction threshold is set based on the emotion of the occupant of the first vehicle, the emotion of the occupant of the second vehicle, or both.

15. A vehicle control apparatus comprising
circuitry configured to
determine, based on a preset interaction threshold, that there is a possibility that a first vehicle and a second vehicle interact with each other while the first vehicle and the second vehicle are under an automated driving mode,
acquire an emotion of an occupant of the first vehicle and an emotion of an occupant of the second vehicle, and
perform vehicle control of travel actuators of the first vehicle, on a basis of the emotion of the occupant of the first vehicle and the emotion of the occupant of the second vehicle,
wherein the emotion of the occupant of the first vehicle is associated with an ambient environment of the first vehicle traveling under a manual driving mode, wherein the emotion of the occupant of the second vehicle is associated with an ambient environment of the second vehicle traveling under the manual driving mode, and wherein the preset interaction threshold is set based on the emotion of the occupant of the first vehicle, the emotion of the occupant of the second vehicle, or both.

\* \* \* \* \*